(12) United States Patent
Kogure

(10) Patent No.: US 11,428,351 B2
(45) Date of Patent: Aug. 30, 2022

(54) LOCK DEVICE FOR PIPE COUPLING AND VALVE COUPLING PART

(71) Applicant: Kitz SCT Corporation, Tokyo (JP)

(72) Inventor: Yusaku Kogure, Gunma (JP)

(73) Assignee: KITZ CORPORATION, Tokyo (JP)

( * ) Notice: Subject to any disclaimer, the term of this patent is extended or adjusted under 35 U.S.C. 154(b) by 99 days.

(21) Appl. No.: 16/962,429

(22) PCT Filed: Dec. 18, 2018

(86) PCT No.: PCT/JP2018/046445
§ 371 (c)(1),
(2) Date: Jul. 15, 2020

(87) PCT Pub. No.: WO2019/187398
PCT Pub. Date: Oct. 3, 2019

(65) Prior Publication Data
US 2021/0071786 A1  Mar. 11, 2021

(30) Foreign Application Priority Data
Mar. 26, 2018  (JP) .................. JP2018-57806

(51) Int. Cl.
*F16L 15/00* (2006.01)
*F16K 51/00* (2006.01)
*F16L 15/08* (2006.01)

(52) U.S. Cl.
CPC .............. *F16L 15/08* (2013.01); *F16K 51/00* (2013.01)

(58) Field of Classification Search
CPC .................. F16K 51/00; F16L 15/08
(Continued)

(56) References Cited

U.S. PATENT DOCUMENTS 4,456,288 A * 6/1984 Conner .................. F16L 21/08
285/321
4,691,541 A * 9/1987 McQuade, Sr. ..... E05B 65/0007
292/207
(Continued)

FOREIGN PATENT DOCUMENTS

JP          62-89516        6/1987
JP          8-105580        4/1996
(Continued)

OTHER PUBLICATIONS

International Search Report dated Mar. 26, 2019 in International (PCT) Application No. PCT/JP2018/046445.

*Primary Examiner* — Kevin R Barss
(74) *Attorney, Agent, or Firm* — Wenderoth, Lind & Ponack, L.L.P.

(57) ABSTRACT

A lock device for a coupling part of a piping or valve of a raw-material container or the like, capable of preventing looseness and erroneous operation of a coupling, and having favorable stability because the device is fixed as a force is applied to a direction of additionally fastening the coupling. The lock device is provided for achieving prevention of looseness of a coupling part (4) formed of a screwed member (20) and a screwing member (21) side, and includes a clamp member (42) for additional fastening attached to the screwed member side, a clamp member (41) for positioning and fixing attached to the screwing member side, and a screw member (43) for fastening the clamp members. The clamp members are fastened with the screw member (43), thereby being fixed to the coupling part while a force is applied to a direction of additionally fastening the screwing member side.

17 Claims, 12 Drawing Sheets

(58) Field of Classification Search
USPC .......................................................... 251/148
See application file for complete search history.

(56) References Cited

U.S. PATENT DOCUMENTS

| | | | |
|---|---|---|---|
| 5,139,289 A | | 8/1992 | Koss |
| 5,222,768 A | * | 6/1993 | Hofer .................... F16L 19/005 |
| | | | 285/39 |
| 5,312,139 A | | 5/1994 | Marks et al. |
| 5,350,201 A | | 9/1994 | Bynum |
| 5,490,693 A | * | 2/1996 | Fisher .................... F16L 19/005 |
| | | | 285/92 |
| 5,524,936 A | | 6/1996 | Barr et al. |
| 7,980,598 B2 | * | 7/2011 | Tsubota .............. F16L 27/0832 |
| | | | 285/80 |
| 10,012,258 B2 | * | 7/2018 | Lambert ............... F16B 39/101 |

FOREIGN PATENT DOCUMENTS

| | | |
|---|---|---|
| JP | 2015-86957 | 5/2015 |
| JP | 2016-38026 | 3/2016 |

* cited by examiner

LOCK DEVICE FOR PIPE COUPLING AND VALVE COUPLING PART

BACKGROUND OF THE INVENTION

1. Technical Field

The present invention relates to a lock device for a pipe coupling and a valve coupling part to prevent looseness after the pipe coupling and the coupling part of the valve are fastened.

2. Description of the Related Art

Conventionally, in a semiconductor manufacturing process, for example, a raw-material container for accommodating a raw material for semiconductor manufacture is generally used. In this case, since many liquid materials for use as raw materials for semiconductor manufacture have a very hazardous property such as toxicity, the raw-material container is required to be strictly sealed so that the raw material does not leak to the outside. On the upper surface of the raw-material container of this type, a valve and a piping for supplying the raw material and purge gas are normally installed via couplings. For transportation, storage, and so forth of the raw-material container, the raw-material container is hermetically sealed so that the raw material does not leak out to the outside by setting the valve in a closed state, jointing a blind coupling to an end part of the piping, and so forth.

However, in the event that the coupling is loosened by vibration, impact, or inadvertent external forces during transportation or storage of the raw-material container or that an inexperienced operator mistakenly operates the coupling when handling the raw-material container in the field, the raw material may leak to pose a great hazard, and this leakage of the raw material may lead to a serious accident.

To avoid this situation, it has been known to use a device for locking to prevent unintended looseness after fastening or looseness due to erroneous operation of the coupling.

As a device for locking to prevent looseness of the coupling, for example, a pipe coupling assembly is disclosed in Japanese Patent Application Laid-Open No. 8-105580. For first and second coupling main bodies coupled via a male screw and a female screw and each having a nut-like outer shape part, this known pipe coupling assembly has a lock clamp which prevents looseness of these. This lock clamp has a first clamp member in which a parallel arm engaged via a flat part with a wrench flat of the nut-like outer shape part of a first coupling main body and a groove part to be engaged with an edge part of a nut-like outer shape part of a second coupling main body are integrally formed in an axis-line direction and a second clamp member in which a groove part to be engaged with the edge part of the nut-like outer shape part of the second coupling main body is formed. The first clamp member and second clamp member are attached so as to interpose the first coupling main body and the second coupling main body from an outer circumferential side toward the axis line, and are fixed to these couplings via a tab portion, an opening, and screw fastening. In this manner, in this pipe coupling assembly, in a state in which each flat part of the first clamp member is arranged at the wrench flat of the nut-like outer shape part of the first coupling main body and the groove part is arranged at the edge part of the nut-like outer shape part of the second coupling main body, the first and second coupling main bodies are tightly attached by fastening the second clamp member to prevent looseness of these.

In another embodiment of JP 8-105580, an end part of a male screw of a valve main body and a female coupling nut member are coupled via a male screw and a female screw, and have attached thereto the first clamp member and the second clamp member. One side of the first clamp member is provided with a first end part in a rectangular plate shape where a through hole for screw insertion is formed, and the other side is provided with a second end part having a groove part. On the other hand, the second clamp member is provided to have a shape similar to the above. The first clamp member is fixed by a screw into a screw hole provided on a bottom surface side of the valve main body via the through hole of the first end part. In a state in which an edge part of the female coupling nut member is arranged at the groove part and the groove part of the second clamp member, these are fastened to prevent looseness.

SUMMARY OF THE INVENTION

1. Technical Problem

However, in JP 8-105580, since attachment is made so that the connected first and second coupling main bodies are interposed from the outer circumferential side toward the axis-line direction, resistance to the force in a direction of looseness of these first and second coupling main bodies is weak. Moreover, the parallel arm and the groove part of the first clamp member are integrally formed in the axis-line direction, and these are arranged in a state of being mutually positioned to a coupling rotation direction. Thus, if the positional relation between the flat part and the groove part of the parallel arm and the positional relation between the nut-like outer shape part of the first coupling main body and the nut-like outer shape part of the second coupling main body do not match, when the second clamp member is fastened, the edge part of the nut may not be engaged with the groove part in a hermetically-sealed state but may be attached in an unstable tightly-attached state. In this case there is a fear that the function of preventing looseness of the coupling part is not achieved and the coupling part is loosened to cause leakage, and this is not suitable at all as, for example, a tool for preventing looseness of a container valve or coupling.

Also in accordance with another embodiment in JP 8-105580, since attachment is made so that the connected coupling portion is interposed from the outer circumferential side toward the axis-line direction, resistance to the force to the direction of looseness is weak. Moreover, since the first end part and the second end part are integrally formed, when the first end part is fixed to the valve main body, the position of the groove part of the second end part is fixed, and fastening may be made in a state in which the edge part of the female coupling nut member is not in close contact with the groove part. Thus, the possibility of occurrence of leakage because the coupling part is loosened is increased, and the embodiment is not suitable for a looseness prevention tool for a container-specific valve or coupling.

In addition to this, intrinsically, the screw hole of the valve main body is provided for fixing to a facility or the like. If this screw hole is used for fixing the first clamp member, it is impossible to fixing to a facility or the like for fluid supply. Thus, in this case, installation of the valve main body is unstable and, with a strong force being applied to the coupling part, looseness occurs, also leading to leakage. Moreover, when the clamp member is installed to the valve main body, it may be necessary to remove the valve main body from a pipe path, thereby degrading convenience. Furthermore, when the first clamp member is attached to the valve main body with a screw, a screw head part protrudes from a bottom surface side of the first end part to degrade balance at the time of mounting on a flat surface, thereby making it impossible to stably install the valve main body. As these, when the clamp member is attached to the valve main body with a screw, usability is degraded.

The present invention has been developed to solve the above-described problems, and has an object of providing a lock device suitable for a coupling part of a piping or valve of a raw-material container or the like, capable of reliably preventing looseness and erroneous operation of a coupling, also having a simple component structure and extremely favorable usability, and having very favorable stability because the device is fixed as a force is applied in a direction of additionally fastening the coupling.

2. Solution to the Problem

To achieve the above-described object, the present invention is directed to a lock device for a pipe coupling and a valve coupling part, the lock device for achieving prevention of looseness of a coupling part formed of a screwed member and a screwing member side including: a clamp member attached to the screwed member side; a separate clamp member attached to the screwing member side; and a screw member for fastening both of these clamp members, wherein both of the clamp members are fastened with the screw member, thereby being fixed to the coupling part while a force is applied to a direction of additionally fastening the coupling part.

The invention according to another aspect is directed to the lock device for the pipe coupling and the valve coupling part including: a first clamp member attached to an outer circumferential side of a male nut of a piped and connected coupling; a second clamp member attached to an outer circumferential side of a female nut; and the screw member for fastening the first clamp member and the second clamp member, wherein by fastening of the first clamp member and the second clamp member, the coupling is fixed to the coupling part while the force is applied to a direction of additionally fastening the coupling.

The invention according another aspect is directed to the lock device for the pipe coupling and the valve coupling part, in which the first clamp member is provided with parallel engaging surfaces for being inserted into two parallel side surfaces of the male nut for engagement to prevent rotation to a coupling axis direction.

The invention according another aspect is directed to the lock device for the pipe coupling and the valve coupling part, in which with a screw hole or an insertion hole formed in the first clamp member and a screw hole or an insertion hole formed in the second clamp member, fastening can be made by the screw member in an inserted state.

The invention according another aspect is directed to the lock device for the pipe coupling and the valve coupling part including: a third clamp member installed on an outer circumferential surface of a piped and connected valve body; a second clamp member attached to an outer circumferential side of a female nut; and the screw member for fastening the third clamp member and the second clamp member, wherein by fastening of the third clamp member and the second clamp member, the coupling is fixed to the coupling part while the force is applied to a direction of additionally fastening the coupling.

The invention according to another aspect is directed to the lock device for the pipe coupling and the valve coupling part, in which the third clamp member is provided with fixing engaging surfaces for positioning and fixing to two parallel side surfaces except a bottom surface on an outer circumferential side of the valve body.

The invention according to another aspect is directed to the lock device for the pipe coupling and the valve coupling part, in which with an insertion hole formed in the second clamp member and a screw hole formed in the third clamp member, fastening can be made by the screw member in an inserted state.

The invention according to another aspect is directed to the lock device for the pipe coupling and the valve coupling part, in which engaging grooves for being locked to outer circumferential edge parts of the female nut in a polygonal shape are formed in a contiguous state on an inner circumferential side of the second clamp member.

The invention according to another aspect is directed to the lock device for the pipe coupling and the valve coupling part, in which the engaging grooves are formed so that concave parts and convex-shaped arc parts are made contiguous to be in a circular state on an inner circumference of the second clamp member.

The invention according to another aspect is directed to the lock device for the pipe coupling and the valve coupling part, in which the screw hole is a female-screw barrel part integrally provided to the first clamp member or the third clamp member.

The invention according to another aspect is directed to the lock device for the pipe coupling and the valve coupling part, in which a washer is attached to one side of the screw member inserted into the insertion hole of the second clamp member and a stop ring is attached to another side.

3. Advantageous Effects of the Invention

From the present invention, the device is suitable for a coupling part of a piping or valve to a raw-material container or the like. The clamp member for positioning and fixing and the clamp member for additional fastening are fastened with the screw member, thereby being fixed as a force is applied to a direction of additionally fastening the coupling part. Thus, mutual rotation of the coupling parts can be prevented, and looseness and erroneous operation of the couplings by accidental external forces can be reliably prevented. Furthermore, with a simple component structure having two separate clamp parts and the screw part, usability is extremely favorable, and its stability is also very favorable. Since attachment can be easily made without removing the coupling part from a pipe path but in a connected state, convenience is also enhanced. When attachment is made to the coupling part of a valve connected to the pipe path, attachment can be easily made without using a portion for piping and fixing of this valve but in a state in which the valve is connected to the pipe path. After attachment, protrusion to a valve placement side occurs. Thus, the strength and the stable state at the time of valve connection to the piping can be ensured.

In accordance with another aspect of the invention, the first clamp member for positioning and fixing is attached to the male nut on the screwing member side and the second clamp member for additional fastening is attached to the female nut on the screwed member side, and these clamp members are fastened together via the screw member. Thus, attachment can be made directly to these without machining the existing coupling having the male nut and the female nut.

With a force applied in a direction of additionally fastening the coupling, looseness and erroneous operation of the coupling can be reliably prevented.

In accordance with another aspect of the invention, the parallel engaging surfaces are disposed outside the two parallel side surfaces of the male nut, thereby allowing the first clamp member to be attached to the male nut with one touch. In a state in which engagement between these two parallel side surfaces and parallel engaging surfaces prevents rotation of the first clamp member relative to the coupling axis direction, the second clamp member attached to the outer circumferential side of the female nut is attached with the screw member, thereby allowing rotation of the coupling to be prevented.

In accordance with another aspect of the invention, the first clamp member and the second clamp member can be easily fastened with the screw member via the screw hole and the insertion hole. Here, when the first clamp member is provided with a screw hole and the second clamp member is provided with an insertion hole or when the first clamp member is provided with an insertion hole and the second clamp member is provided with a screw hole, in a state in which the screw member is screwed into the screw hole, this screw member is fastened. Thus, a force is exerted in a direction of fastening the clamp member on one side provided with the screw hole to the clamp member on the other side provided with the insertion hole and, with this fastening force, the coupling part is additionally fastened to allow looseness and erroneous operation of the coupling to be reliably prevented. Furthermore, if the insertion hole provided on one side is formed in a long hole shape to provide a backlash, even if the male nut and the female nut are jointed in a state of being deviated as rotating about the coupling axis, the clamp member on the other side is positionally adjusted with respect to the clamp member on one side, thereby attaching the first and second clamp members to appropriate positions of the coupling and allowing this coupling to be firmly fastened. Also, when the first and second clamp members are each provided with the insertion hole, these are fastened with the screw member while being positionally adjusted, thereby allowing looseness and erroneous operation of the coupling to be prevented. In any case, by loosening the screw member, the first clamp member and the second clamp member can be easily removed.

In accordance with another aspect of the invention, the third clamp member for positioning and fixing is attached to the outer circumferential surface of the valve body on the screwed member side and the second clamp member for additional fastening is attached to the female nut on the screwing member side, and these clamp members are fastened together via the screw member. Therefore, without machining the existing valve and the coupling having the female nut, attachment can be made directly to these. Since a force is applied to a direction of additionally fastening the coupling, looseness and erroneous operation of the coupling can be reliably prevented. The second clamp member can be used as a common component and, as with the case of the male nut, the screwing member side can be fixed to the coupling part.

In accordance with another aspect of the invention, the third clamp member can be attached to the valve body with one touch via the fixing engaging surfaces. Since these fixing engaging surfaces are engaged with two parallel side surfaces except the bottom surface on the outer circumferential side of the valve body, in a state in which rotation of the third clamp member in the coupling axis direction is prevented, the second clamp member attached to the outer circumferential side of the female nut is attached with the screw member, and rotation of the coupling can be prevented.

In accordance with another aspect of the invention, the second clamp member and the third clamp member can be easily fastened with the screw member via the insertion hole and the screw hole. Here, when the second clamp member is provided with an insertion hole and the third clamp member is provided with a screw hole or when the second clamp member is provided with a screw hole and the third clamp member is provided with an insertion hole, in a state in which the screw member is screwed into the screw hole, this screw member is fastened. Thus, a force is exerted in a direction of fastening the clamp member on one side provided with the screw hole to the clamp member on the other side provided with the insertion hole and, with this fastening force, the coupling part is additionally fastened to allow looseness and erroneous operation of the coupling to be reliably prevented. Furthermore, if the insertion hole provided on one side is formed in a long hole shape to provide a backlash, even if the male nut and the female nut are jointed in a state of being deviated as rotating about the coupling axis, the clamp member on the other side is positionally adjusted with respect to the clamp member on one side, thereby attaching the second and third clamp members to appropriate positions of the coupling and allowing this coupling to be firmly fastened. Also, when the second and third clamp members are each provided with the insertion hole, these are fastened with the screw member while being positionally adjusted, thereby allowing looseness and erroneous operation of the coupling to be prevented. In any case, by loosening the screw member, the second clamp member and the third clamp member can be easily removed.

In accordance with another aspect of the invention, with many engaging grooves formed in the second clamp member, in a state in which these engaging grooves are locked to the outer circumferential edge parts of the female nut to prevent looseness, the second clamp member can be attached to the female nut.

In accordance with another aspect of the invention, when the separate clamp is jointed and fastened with the screw member, the coupling part can be reliably fixed while one surface of the convex-shaped arc part is engaged with one side surface of the female nut and a force is applied in a direction of additionally fastening the coupling part. There is no fear of looseness of the coupling part.

In accordance with another aspect of the invention, since the female-screw barrel part is integrally provided to the first clamp member or the third clamp member, there is no worry that a nut or the like drops. Thus, operability is favorable, and the value in use as a lock device is large.

In accordance with another aspect of the invention, the washer and the stop ring are attached to the screw member. Thus, since the state is such that the screw member is temporarily attached to the second clamp member, the jointing operation is convenient, and operability is also favorable.

DETAILED DESCRIPTION OF EMBODIMENTS OF THE INVENTION

Figure 1:
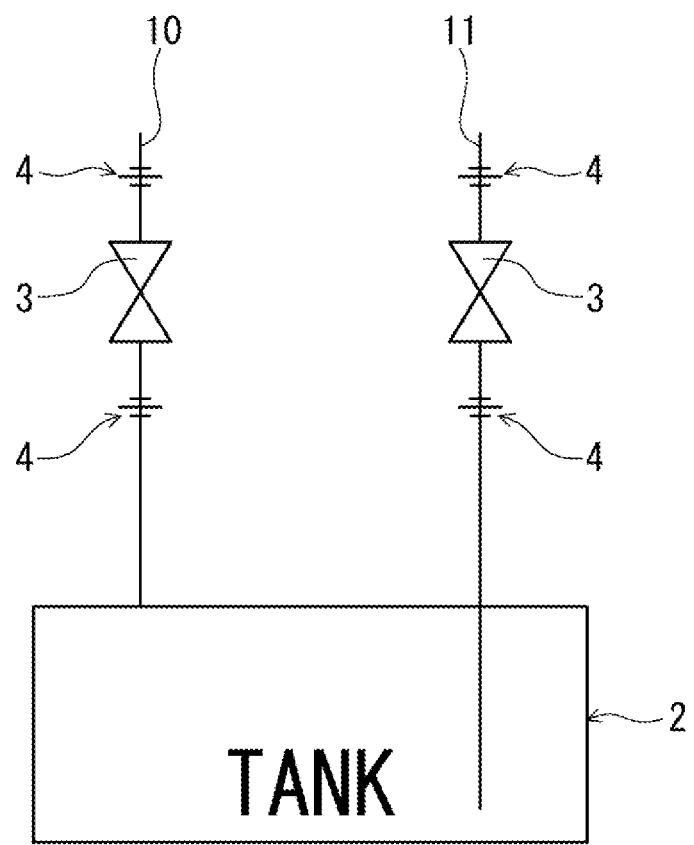
FIG. 1 is a general schematic view depicting one example of a raw-material container.
Figure 2:
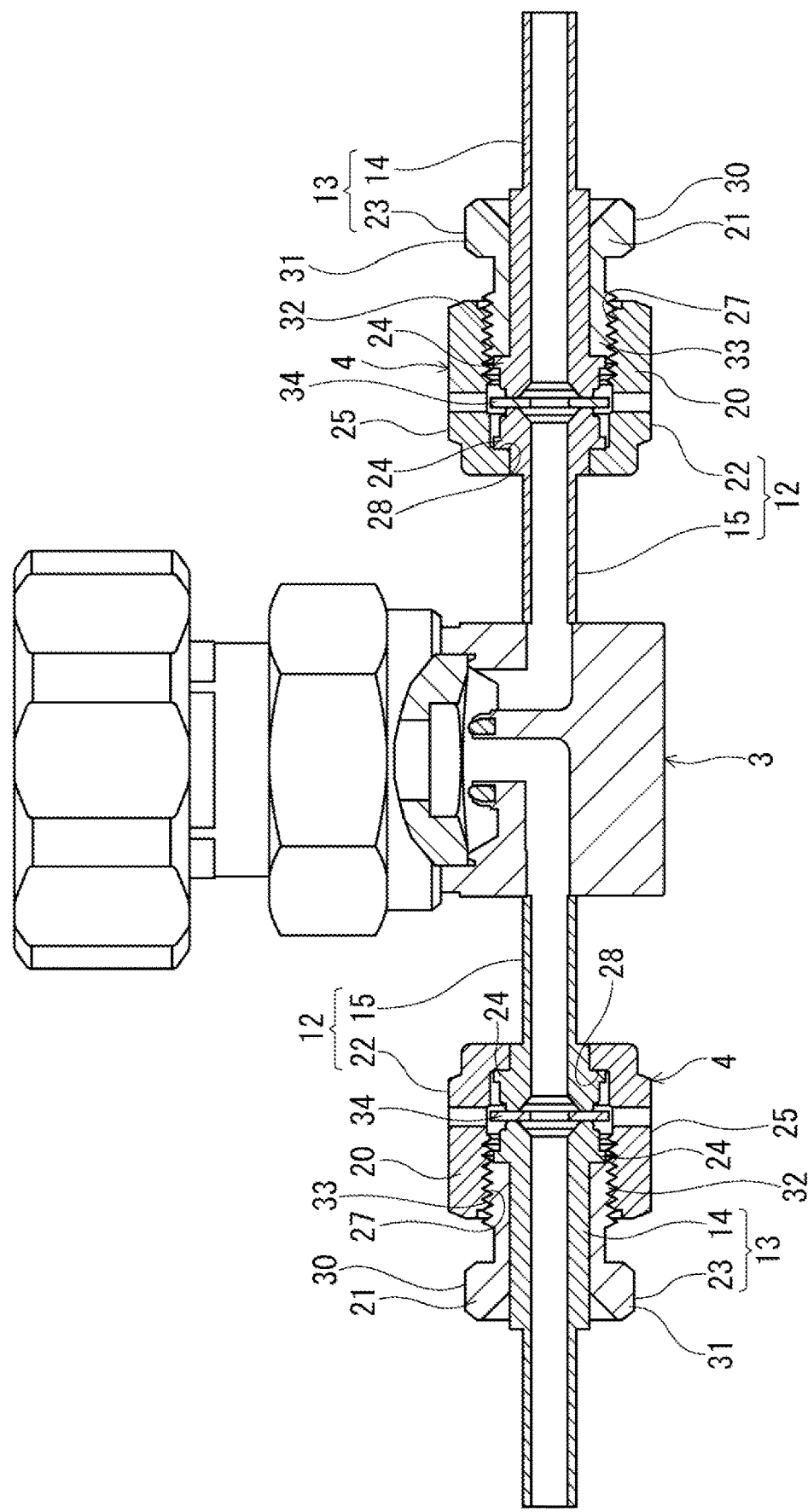
FIG. 2 is a partially-cutout front view depicting a pipe coupling and a valve coupling part in FIG. 1.
Figure 4:
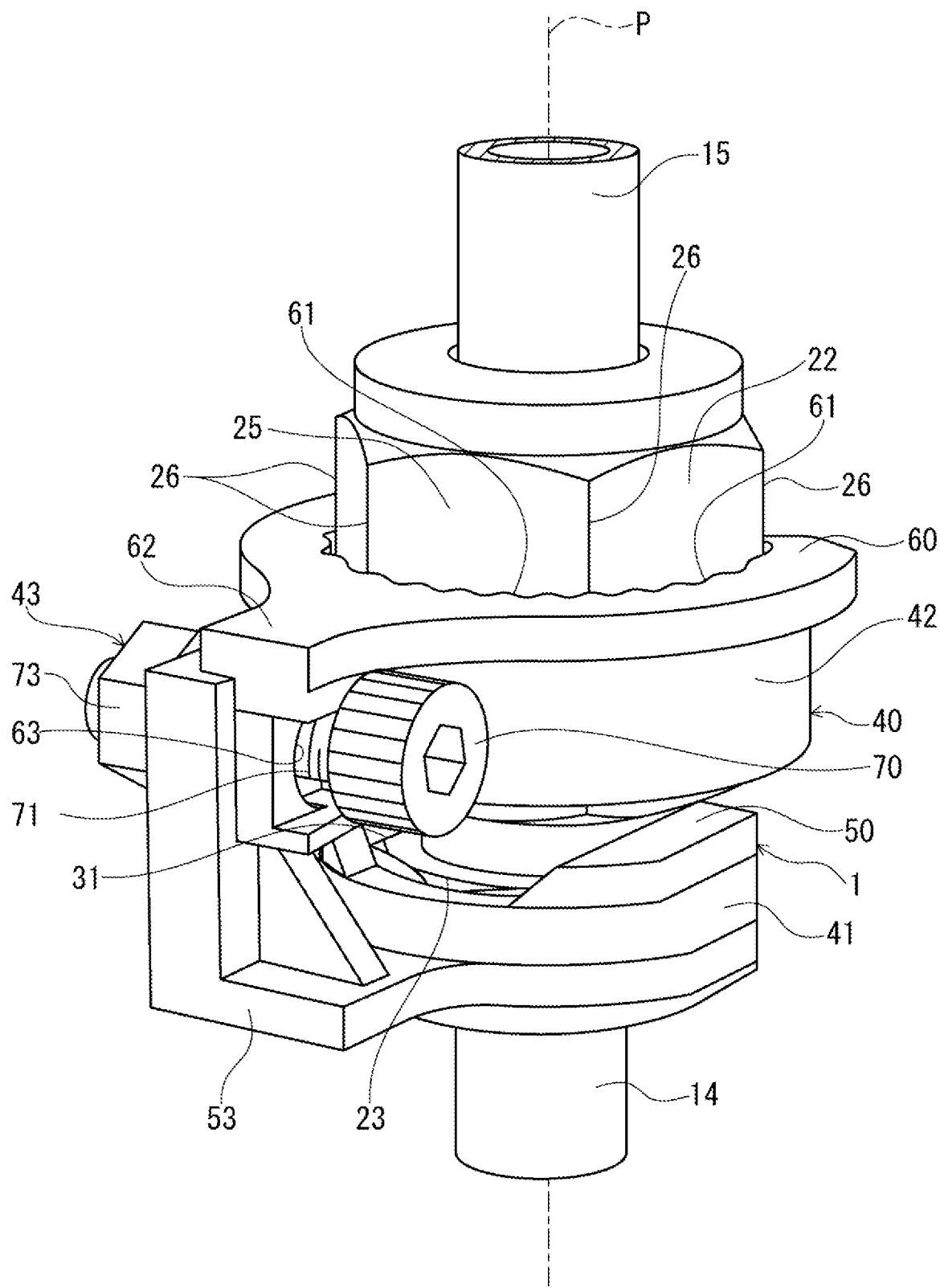
FIG. 4 is a perspective view depicting a first embodiment of a lock device for a pipe coupling and a valve coupling part of the present invention.

In the following, embodiments of the lock device for the pipe coupling and the valve coupling part of the present invention are described in detail based on the drawings. FIG. 1 is a general schematic view depicting one example of a raw-material container, FIG. 2 is a partially-cutout front view depicting a pipe coupling and a valve coupling part in FIG. 1, and FIG. 4 depicts a first embodiment of the lock device for the pipe coupling and the valve coupling part in the present invention. First, a raw-material container 2, a valve main body 3, and a coupling part 4 are described, for which the lock device (hereinafter referred to as a device main body 1) for the pipe coupling and the valve coupling part is used.

The raw-material container 2 depicted in FIG. 1 is used in, for example, a semiconductor manufacturing process. This raw-material container 2 is provided with an introduction flow path 10 which introduces a fluid to the inside and a discharge flow path 11 which discharges the inner fluid. These introduction flow path 10 and the discharge flow path 11 are each provided with the valve main body 3 and the coupling part 4. The device main body 1 is provided to prevent looseness of the coupling part 4.

The raw-material container 2 is provided in a substantially cylindrical shape; has accommodated therein, for example, a liquid such as tetrahydrofuran or triethoxyborane or a raw material for gasification, which is a solid-state semiconductor manufacturing material; and is configured so as to be able to vaporize and sublime this raw material for gasification and supply to a chamber or the like, not depicted, connected outside via the coupling part 4 and the valve main body 3.

Each of opposite sides of the valve main body 3 is provided with a connecting pipe 15 adhered by welding or the like. The valve main body 3 is connected between these connecting pipes 15 and connecting pipes 14 provided to the raw-material container 2 and to an external piping, respectively, and is provided so as to be able to open and close a flow path.

Figure 3:
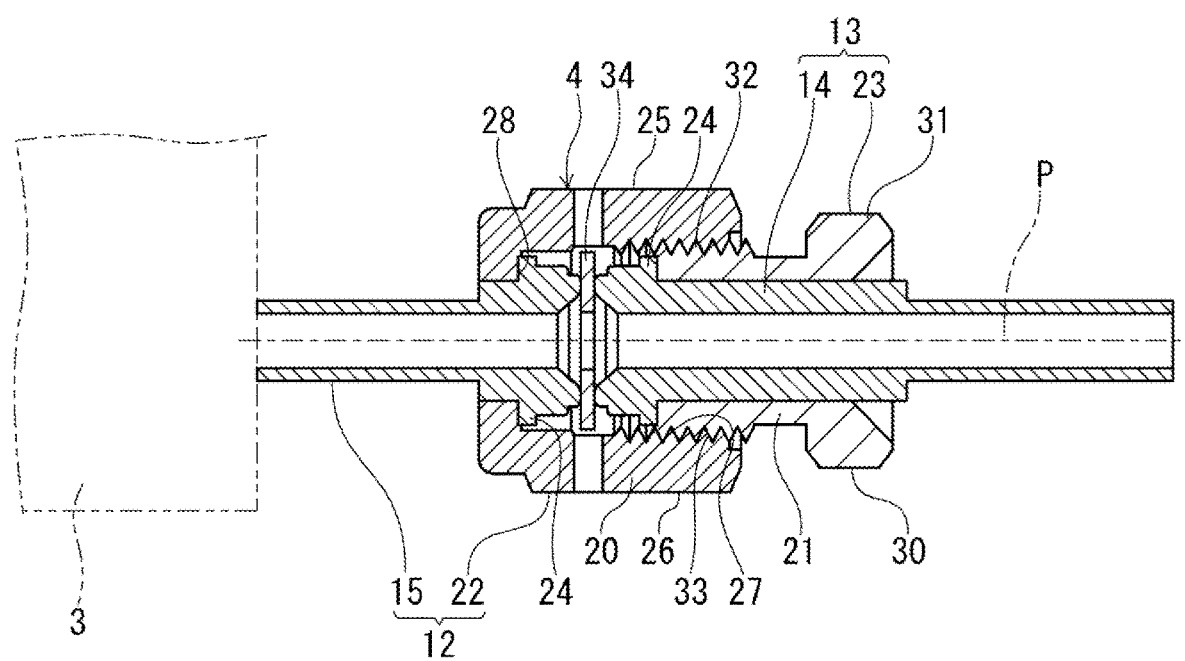
FIG. 3 is an enlarged sectional view of main parts of FIG. 2.

In FIG. 2 to FIG. 4, the coupling part 4 is formed of a union coupling, and, in the present example, is provided to each of a primary side and a secondary side of the valve main body 3. With this coupling part 4, a pipe coupling and a valve coupling part are connected.

Each coupling part 4 is formed of a screwed member 20 and a screwing member 21. The coupling parts 4, 4 on the primary and secondary sides of the valve main body 3 are provided in the same inner structure, and are provided to have a symmetrical fastening structure centered on the valve main body 3. The screwed member 20 of the coupling part 4 in the present embodiment has a female nut 22 in a cap-nut shape. On the other hand, the screwing member 21 has a male nut 23. The female nut 22 and the connecting pipe 15 provided on a valve coupling part side configure a coupling 12, and the male nut 23 and the external connecting pipe 14 configure a coupling 13. And, the connecting pipe 14 and the connecting pipe 15 are connected via the female nut 22 and the male nut 23.

Of each of the connecting pipes 14 and 15, the connecting pipe 14 is integrally adhered to the raw-material container 2 by welding and, on the other hand, is provided also to the secondary side of the valve main body 3 as an external piping. To each connecting pipe 14, the connecting pipe 15, which is a valve coupling part of the valve main body 3, is connectably provided. Connecting sides of the connecting pipes 14 and 15 are provided to have a substantially identical shape, and each outer circumference at its tip is provided with an annular flange part 24.

On the outer circumference of the female nut 22 of the screwed member 20, a regular hexagonal part 25 is formed. Between surfaces forming this regular hexagonal part 25, an outer circumferential edge part 26 is formed. On the inner circumferential surface of the female nut 22, a female screw 27 is formed, and is provided so as to allow the connecting pipe 14 to be inserted inside the female nut 22. Inside a tip side (side to be inserted into the valve main body 3) of the female nut 22, an annular step part 28 is provided. With the annular flange part 24 of the connecting pipe 15 locked to this annular step part 28, the female nut 22 is attached in a state of being prevented from dropping from the connecting pipe 15.

On the outer circumference of the male nut 23 of the screwing member 21, a regular hexagonal part 30 is formed. Of the surfaces forming this regular hexagonal part 30, surfaces parallel to each other provide two parallel side surfaces 31. On a side connected to the female nut 22 away from the regular hexagonal part 30, a male screw part 33 having a male screw 32 screwable into the female screw 27 is formed.

When the screwed member 20 and the screwing member 21 are connected, the male nut 23 is screwed into the female nut 22 in a state in which a seal member 34 formed of a gasket is interposed between tip surfaces of the connecting pipes 14 and 15. By fastening the male nut 23, the connecting pipe 14 advances in a direction toward the connecting pipe 15. In the state in which the seal member 34 is interposed between the tip surfaces, the couplings 12 and 13 are piped and connected to each other to configure the coupling part 4. Via this coupling part 4, the valve main body 3 and the raw-material container 2 are connected, and the valve main body 3 and the external piping are connected.

While the female nut 22 is provided on a valve main body 3 side as a screwed side and the male nut 23 is provided on a raw-material container 2 and an external coupling side as a screwing side in the present embodiment, the male nut 23 may be provided on the side of the valve main body 3 and the female nut 22 may be provided on the external coupling side.

In FIG. 4, the device main body 1 has a clamp member 40. This clamp member 40 includes a clamp member 41 for positioning and fixing, a clamp member 42 for additional fastening, and a screw member 43 for fastening both of the clamp members 41 and 42. The clamp member 41 is provided so as to be attachable to a screwing member side, and the clamp member 42 is provided so as to be attachable to a screwed member side. Both of the clamp members 41 and 42 are fastened with the screw member 43, thereby fixing as a force is applied in a direction of additionally fastening the coupling part 4.

In the present embodiment, the clamp member 41 is taken as a first clamp member, and the clamp member 42 is taken as a second clamp member. The first clamp member 41 is attached to the outer circumferential side of the male nut 23, which is the screwing member side, and the second clamp member 42 is attached to the outer circumferential side of the female nut 22, which is the screwed member 20 side.

Figure 5A:
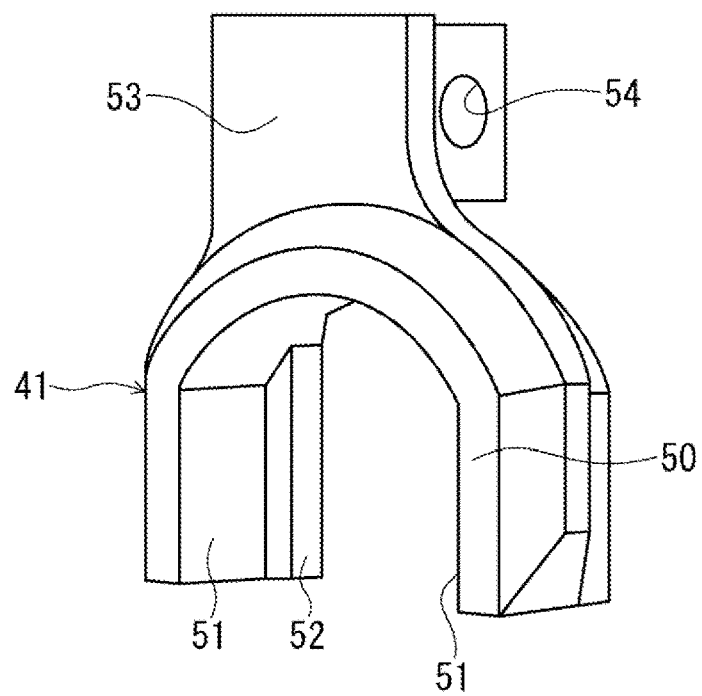
FIG. 5(a) is a perspective view of a first clamp member and FIG. 5(b) is a perspective view of a second clamp member.

In FIG. 5(a), the first clamp member 41 has an engaging part 50 in a substantially U shape. On the inner circumference of this engaging part 50, parallel engaging surfaces 51 are provided, each having a width dimension equal to or slightly larger than that of each of the two parallel side surfaces 31 of the male nut 23. With the parallel engaging surfaces 51 inserted onto the two parallel side surfaces 31, the first clamp member 41 can be engaged with the male nut 23. This engagement prevents the first clamp member 41 from rotating in a coupling axis P direction with respect to the male nut 23.

On a side of the engaging part 50 of the first clamp member 41 facing the second clamp member 42, protruding pieces 52 protruding inside from the parallel engaging surfaces 51 are provided on both sides, and are provided so that these protruding pieces 52 can be locked to the end face of the female nut 22. With the parallel engaging surfaces 51 being engaged with the two parallel side surfaces 31 in a state in which the protruding pieces 52 are locked to the end face of the female nut 22 and with this abutting of the protruding pieces 52 on the end face of the female nut 22, the first clamp member 41 is provided so as not to be droppable.

On an upper part of the engaging part 50, a connecting piece 53 for connection with the second clamp member 42 is formed and provided to protrude. This connecting piece 53 is provided to have a substantially L shape in a planar view. With this shape, the connecting piece 53 is arranged at a position with its center slightly deviated from the coupling axis P depicted in FIG. 6, thereby being allowed to be fastened with the second clamp member 42, which will be described further below.

The connecting piece 53 has a screw hole 54 formed therein. The screw member 43 is provided so as to be attachable to this screw hole 54.

Figure 5B:
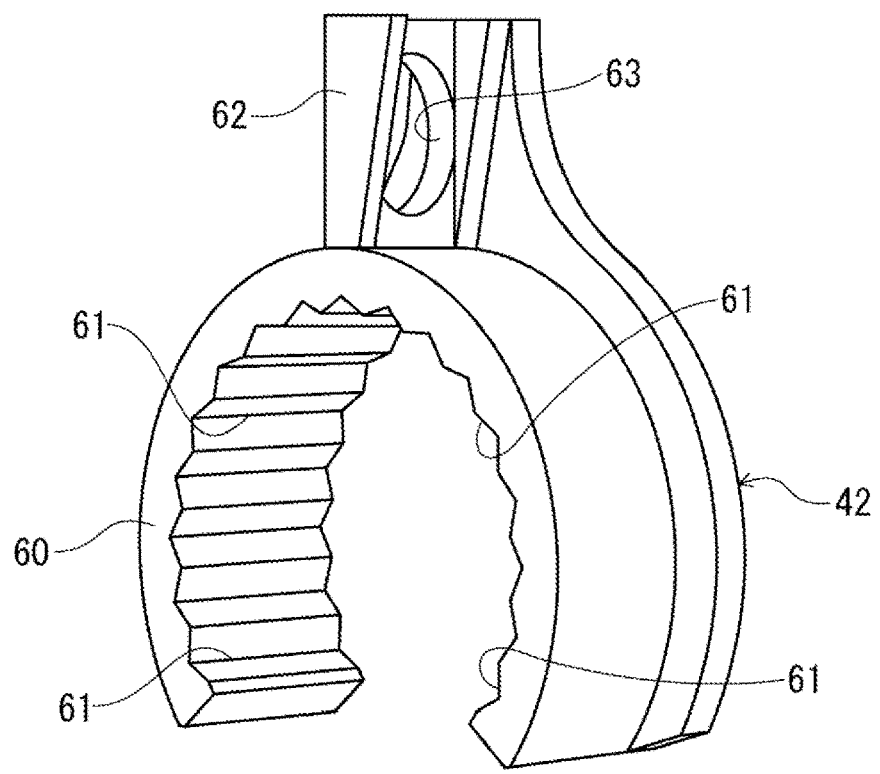

On the other hand, in FIG. 5(b), the second clamp member 42 has an engaging annular part 60 in a substantially C shape. On the inner circumference of this engaging annular part 60, a plurality of engaging grooves 61 are formed for locking to the outer circumferential edge parts 26 of the female nut 22. The second clamp member 42 can be engaged with the female nut 22 by locking the engaging grooves 61 to the outer circumferential edge parts 26. This engagement can prevent rotation of the second clamp member 42 relative to the coupling axis P direction with respect to the female nut 22. The angle, not depicted, of each engaging groove 61 is formed on the order of 120 degrees, which is substantially equal to the angle of the outer circumferential edge part 26 of the female nut. With the outer circumferential edge parts 26 locked to these engaging grooves 61, positional deviation is prevented, and rotation of the second clamp member 42 with respect to the female nut 22 can be prevented.

On an upper part of the engaging annular part 60, a connection piece part 62 for connection with the first clamp member 41 is formed and provided so as to protrude therefrom. This connection piece part 62 is formed on a substantially upward-extended line of the coupling axis P in FIG. 6 when the second clamp member 42 is fixed to the female nut 22.

At a tip side of the connection piece part 62, an insertion hole 63 as a through hole is formed. In a state in which this insertion hole 63 coincides with the screw hole 54, the first clamp member 41 and the second clamp member 42 are provided so as to be able to be fastened together, with the screw member 43 being in an inserted state. The insertion hole 63 is formed to have an elongated hole shape, and is provided so as to allow the second clamp member 42 to be positionally adjusted via the hole 63 with respect to the first clamp member 41. The insertion hole 63 may be provided to have a circular hole.

The screw member 43 is formed of a bolt member 70 formed of a hexagon socket bolt and a nut member 73 having a female screw 72 into which a male screw 71 of this bolt member 70 can be screwed. The male screw 71 of the bolt member 70 is provided so as to be screwable into the screw hole 54 of the connecting piece 53. The screw hole 54 and the insertion hole 63 are provided so as to be able to be fastened together, with the screw member 43 being in an inserted state.

Note that although not depicted, conversely to the above-described case of the embodiment, an insertion hole may be provided in the first clamp member 41 and a screw hole may be provided in the second clamp member 42. Also, insertion holes may be provided in both of the first clamp member 41 and the second clamp member 42.

Next, a procedure and operation are described when the coupling part 4 is fixed by the pipe coupling and the valve coupling part in the device main body 1 described above.

When the coupling part 4 is fixed by the device main body 1 described above, first, to the male nut 23 of the coupling part 4 in a connected state, while the parallel engaging surfaces 51 are inserted onto the two parallel side surfaces 31, the first clamp member 41 is attached so as to become in a state of being engaged with an outer circumferential position of the male nut 23 from its side surface. With this, the first clamp member 41 is temporarily attached to the male nut 23 in a state in which rotation relative to the coupling axis P direction is prevented.

On the other hand, the second clamp member 42 is attached to an outer circumferential position of the female nut 22 of the coupling part 4 in a connected state. The engaging grooves 61 are locked to the outer circumferential edge parts 26 of the female nut 22. In this case, the second clamp member 42 can be temporarily attached to the female nut 22 when the engaging grooves 61 match the positions of the outer circumferential edge parts 26, and the connecting piece part 62 is arranged at a position among several rotation positions allowing temporary attachment, where a predetermined relative angle relation is achieved with respect to the connecting pieces 53 of the first clamp member 41. This predetermined relative angle relation refers to a positional relation in which the screw hole 54 of the first clamp member 41 and the insertion hole 63 of the second clamp member 42 are approximately coaxial to allow these members to be fastened by inserting the screw member 43 for fastening.

In this arrangement relation between the first clamp member 41 and the second clamp member 42, if the male screw 71 of the bolt member 70 is screwed into the screw hole 54 in a state of being inserted into the insertion hole 63, the first clamp member 41 and the second clamp member 42 are fastened. This fastening fastens the first clamp member 41 and the second clamp member 42. Fastening the clamp members fixes the device main body 1 to the coupling part 4 while applying a force in the direction of additionally fastening the coupling part 4.

Figure 6:
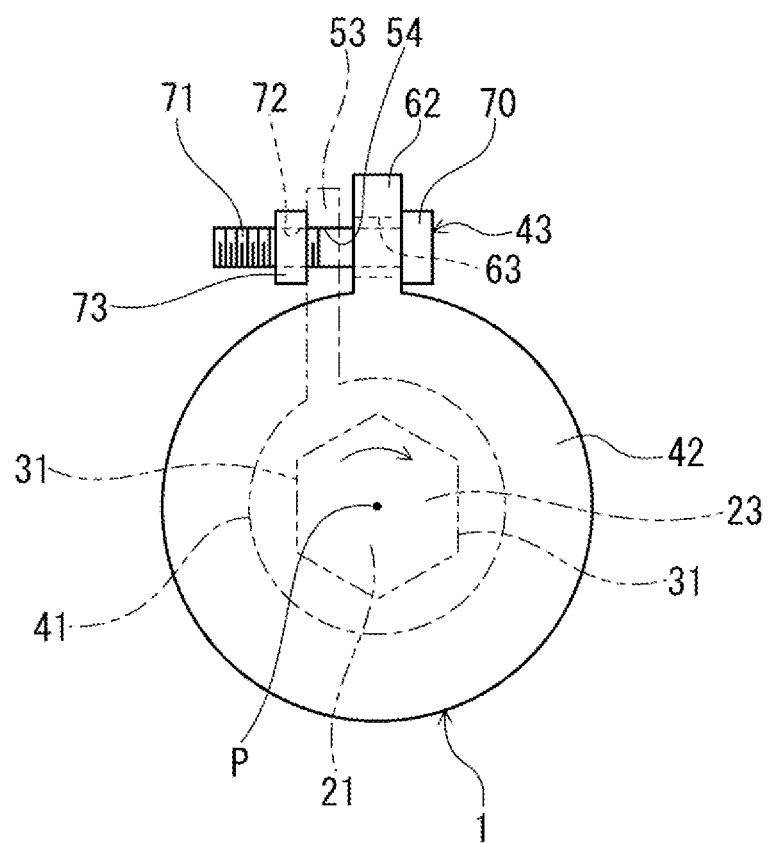
FIG. 6 is a schematic view depicting an attached state of the lock device of the present invention.

With this, in FIG. 6, the first clamp member 41 rotates about the coupling axis P with respect to the second clamp member 42. To the connecting piece 53, that is, the first clamp member 41, a force in a right direction indicated by an arrow in the drawing, that is, a force to a direction of fastening with respect to the second clamp member 42, is applied to the first clamp member 41. Thus, with this fastening force, the coupling part 4 can be additionally fastened.

With the action of this force, the first clamp member 41 and the second clamp member 42 are firmly fixed to the coupling part 4 in a rattle-free state, and their looseness can be reliably prevented. Thus, mutual rotation of the couplings 12 and 13 can be prevented, and looseness and erroneous operation of these couplings 12 and 13 by external forces can be inhibited. Furthermore, without removing or processing the male nut 23 and the female nut 22, the device main body 1 can be attached in a piped and connected state. When the device main body 1 is fixed, the force in the additional fastening direction increases as fastening torque of the screw member 43 is increased. Thus, when the torque exceeds a predetermined torque, the female nut 22 and the male nut 23 start moving in the fastening direction, thereby also achieving additional fastening of the couplings.

If the nut member 73 is screwed onto the bolt member 70 after the bolt member 70 is fastened to a predetermined position, further rotation of the bolt member 70 can be prevented, and the screw member 43 can be fixed.

Note that when an insertion hole is provided in the first clamp member 41 and a screw hole is provided in the second clamp member 42, if the male screw 71 of the bolt member 70 is screwed into the screw hole of the second clamp member in a state of being inserted from the insertion hole of the first clamp member, the first clamp member and the second clamp member can be fastened in a manner similar to the above. Furthermore, with the nut member 73 screwed onto the bolt member 70, the screw member 43 can be fixed.

Also, when insertion holes are provided in both of the first clamp member 41 and the second clamp member 42, the nut member 73 and the bolt member 70 are fastened while the first and second clamp members are positionally adjusted, thereby applying a force to the additional fastening direction to the coupling to allow looseness and erroneous operation to be prevented. In this case, if the nut member 73 is fixed with a double nut, looseness between the nut member 73 and the bolt member 70 can be prevented.

Figure 7:
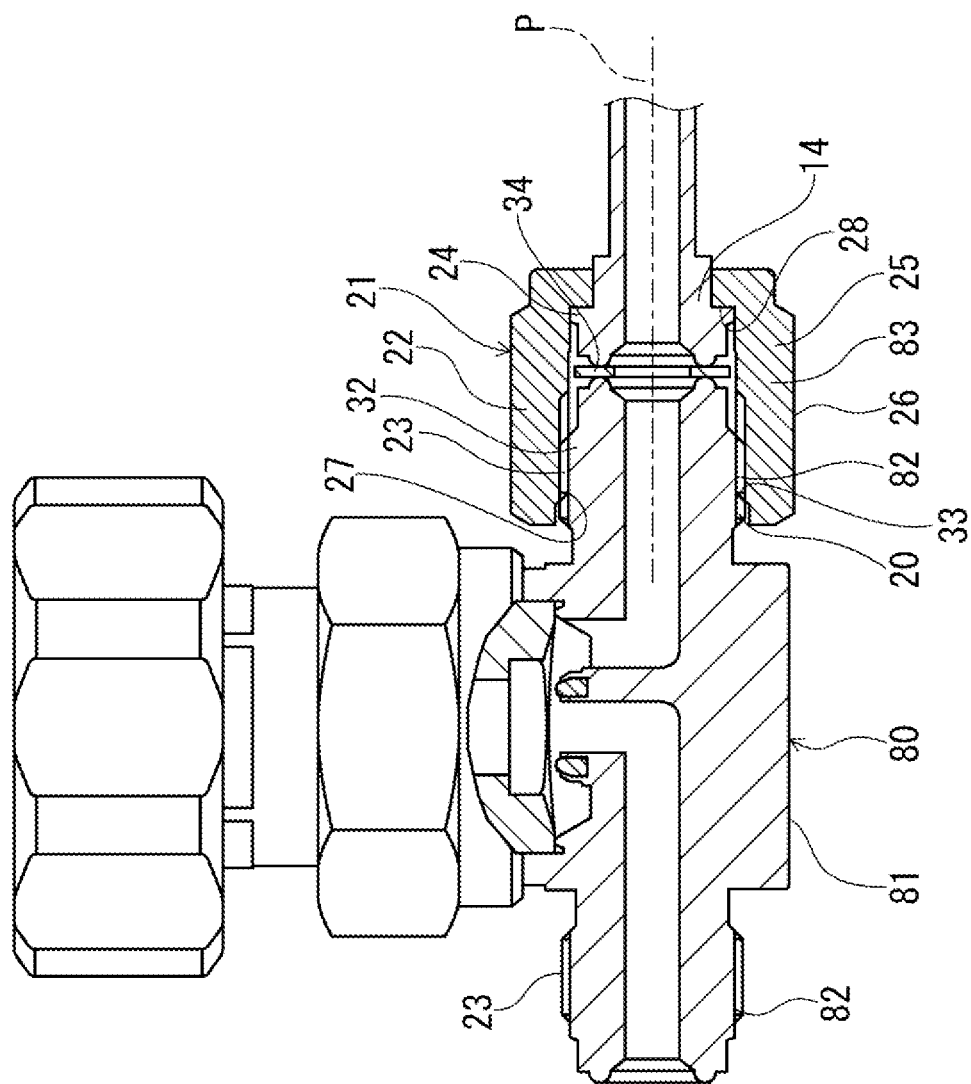
FIG. 7 is a partially-cutout front view depicting another example of the pipe coupling.
Figure 8:
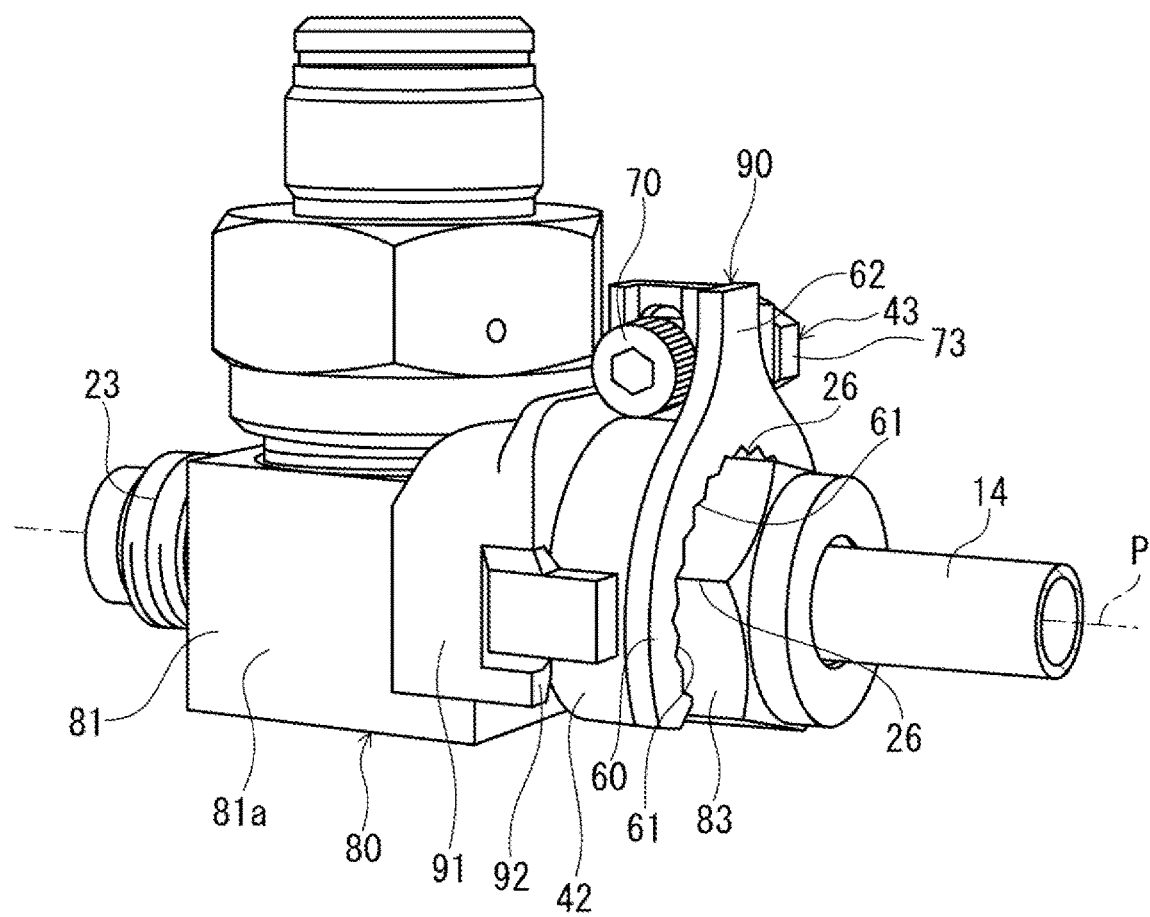
FIG. 8 is a perspective view depicting a second embodiment of the lock device for the pipe coupling and the valve coupling part of the present invention.
Figure 9A:
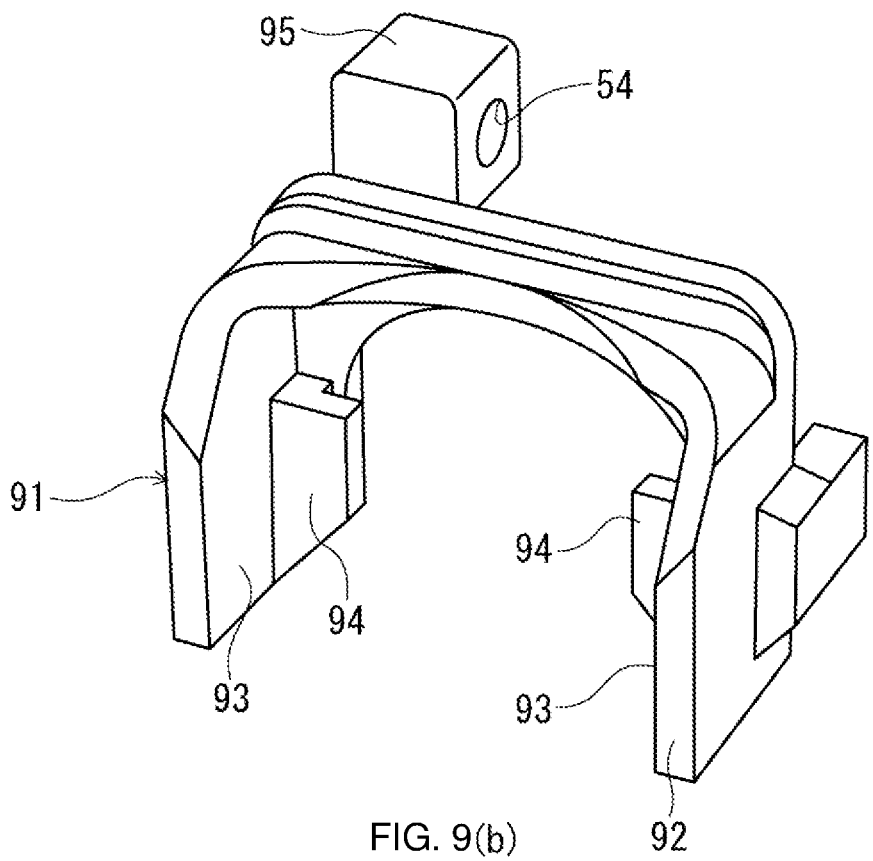
FIG. 9 is a perspective view of a third clamp member.
Figure 9B:
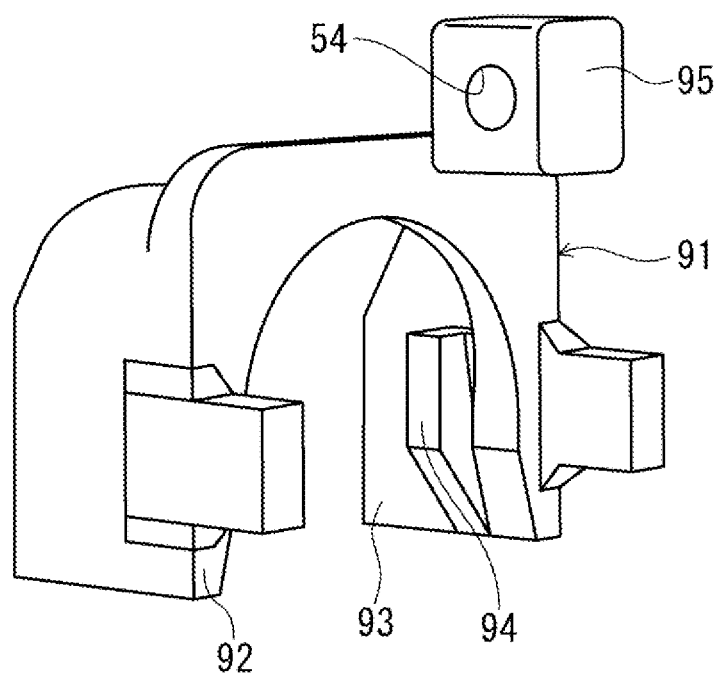

Depicted in FIG. 7 is another example of the pipe coupling. Depicted in FIG. 8 and FIG. 9 is a second embodiment of the lock device for the pipe coupling and the valve coupling part of the present invention. Note in this embodiment that a portion identical to that of the above-described embodiment is denoted by the same reference numeral and its description is omitted.

In this embodiment, when the coupling part 4 is configured onto a valve body 81 of a valve main body 80, a screwed member 82 has the male nut 23, a screwing member 83 has the female nut 22 in a cap-nut shape, and the connecting pipe 14 is connected via the male nut 23 and the female nut 22. That is, the male nut 23 is provided on a side of the valve main body 80 as a screwed side and the female nut 22 is provided on an external coupling side as a screwing side.

In FIG. 8 and FIG. 9, a device main body 90 includes a second clamp member 42 for additional fastening, which is a component common to that in the above-described embodiment; a third clamp member 91 for positioning; and a screw member 43 for fastening the third clamp member 91 and the second clamp member 42, which is a component common to that in the above-described embodiment. The third clamp member 91 is installed on the outer circumferential surface of the valve body 81 of the valve main body 80, which is on a screwed member side. The second clamp member 42 is attached to an outer circumferential side of the female nut 22, which is on a screwing member side. The third clamp member 91 and the second clamp member 42 are fastened, thereby being fixed as a force is applied in a direction in which the coupling part 4 additionally fastens the valve main body 80 and the connecting pipe 14.

The third clamp member 91 has an engaging part 92 in a rectangular frame shape. On the inner circumference of this engaging part 92, fixing engaging surfaces 93 are provided. The fixing engaging surfaces 93 are provided in parallel at two locations for positioning and fixing to two side surfaces 81a in parallel other than the bottom surface on an outer circumferential side of the valve body 81.

On a side of the third clamp member 91 facing the second clamp member 42, protruding pieces 94 protruding inside from the fixing engaging surfaces 93 are provided on both sides, and are provided so that the third clamp member 91 can be locked to the end face of the female nut 22 via these protruding pieces 94. With the fixing engaging surfaces 93 being positioned and fixed to two side surfaces in a state in which the protruding pieces 94 are locked to the end face of the female nut 22 and with the protruding pieces 94 abutting on the end face of the female nut 22, the third clamp member 91 is provided so as not to be droppable.

On an upper part of the engaging part 92, a connecting piece 95 for connection to the second clamp member 42 is formed and provided to protrude. This connecting piece 95 is arranged at a position slightly deviated from the coupling axis P in a planar view. This allows fastening to the connecting piece part 62 of the second clamp member 42.

In the connecting piece 95, a screw hole 54 is formed to which the screw member 43 can be attached. With this screw hole 54 and the insertion hole 63 formed in the second clamp member 42, fastening can be made with the screw member 43 in an inserted state.

When the coupling part 4, that is, the connecting pipe 14 in a stated of being connected by the male nut 23 and the female nut 22 via the seal member 34, of the valve main body 80 is fixed by the device main body 90 described above, first, while the fixing engaging surfaces 93 are engaged so as to interpose the two side surfaces 81a, 81a of the valve body 81, the third clamp member 91 is attached to the valve main body 80. With this, the third clamp member 91 is temporarily attached to the male nut 23 integrally formed to the valve body 81 in a state in which rotation to the coupling axis P direction is prevented.

On the other hand, while the engaging grooves 61 are engaged with the outer circumferential edge parts 26, the second clamp member 42 is attached to an outer circumferential position of the female nut 22. Then, the connecting piece parts 62 of the second clamp member 42 are arranged at positions where a predetermined relative angle relation is achieved with respect to the connecting pieces 95 of the third clamp member.

In this arrangement relation between the third clamp member 91 and the second clamp member 42, if the male screw 71 of the bolt member 70 is screwed into the screw hole 54 in a state of being inserted into the insertion hole 63, the third clamp member 91 and the second clamp member 42 are fastened. This fastening fastens the third clamp member 91 and the second clamp member 42. Fastening these can fix the device main body 90 as applying a force in the direction of additionally fastening the coupling part 4.

In this case, as with the above-described embodiment, if the nut member 73 is screwed onto the bolt member 70 after the bolt member 70 is fastened to a predetermined position, further rotation of the bolt member 70 can be prevented, and the screw member 43 can be fixed.

Also, when insertion holes are provided in both of the third clamp member 91 and the second clamp member 42, while these are positionally adjusted, the nut member 73 and the bolt member 70 are fastened, thereby allowing a force in the additional fastening direction to be applied to the coupling. Here, if the nut member 73 is fixed with a double nut, looseness between the nut member 73 and the bolt member 70 can be prevented.

With the action of the force by the second clamp member 42 and the third clamp member 91 described above, these can be firmly fixed to the coupling part 4, mutual rotation of the couplings is prevented, and looseness and erroneous operation by external forces can be prevented. Furthermore, fixing of the coupling part 4 to the device main body 90 is made for additional fastening of the coupling part 4, thereby allowing an improvement of the fastening force.

Figure 10A:
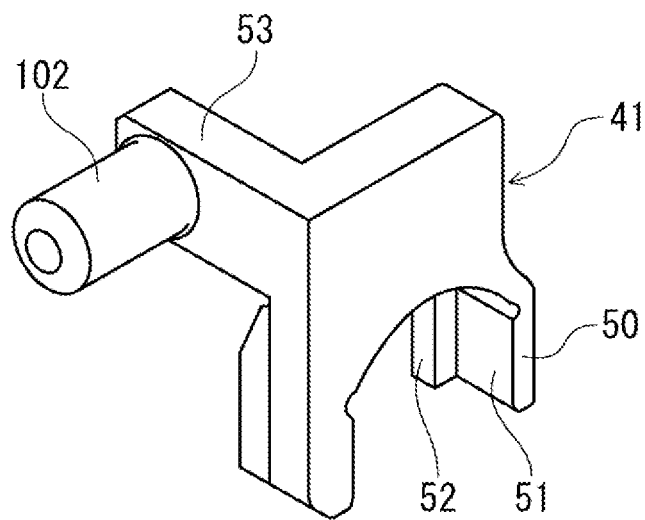
FIG. 10(a) is a perspective view depicting another example of the first embodiment of the first clamp member and FIG. 10(b) is a perspective view depicting another example of the second clamp member of the same as above.
Figure 10B:
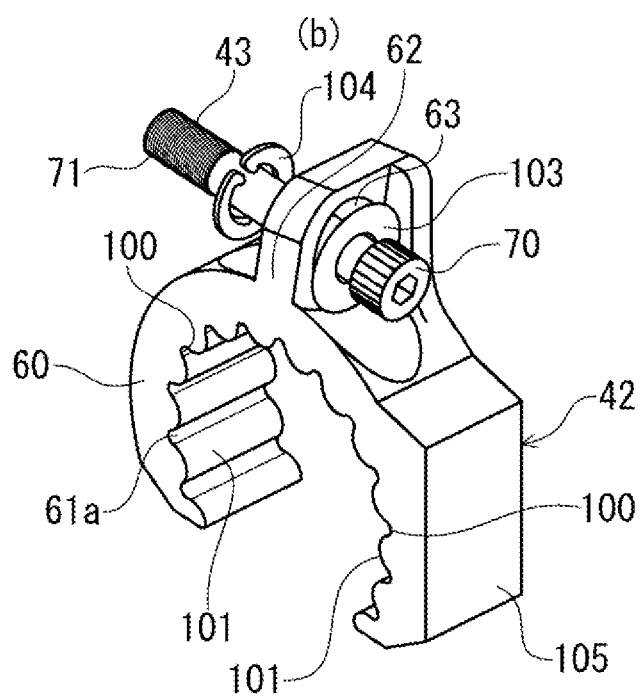

FIG. 10 and FIG. 11 depict another example of the first embodiment described above, and FIG. 12 depicts another example of the second embodiment. Here, identical portions in the first embodiment and the second embodiment are denoted by the same reference numerals and description thereof is omitted.

Figure 11A:
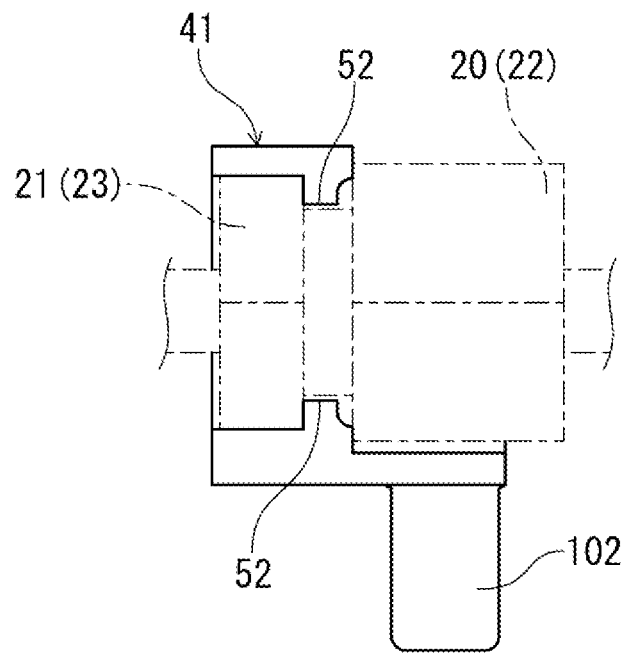
FIG. 11(a) is a descriptive diagram of a partially-cutout bottom surface depicting another example of the first embodiment and FIG. 11(b) is a partially-cutout side view of the same as above.
Figure 11B:
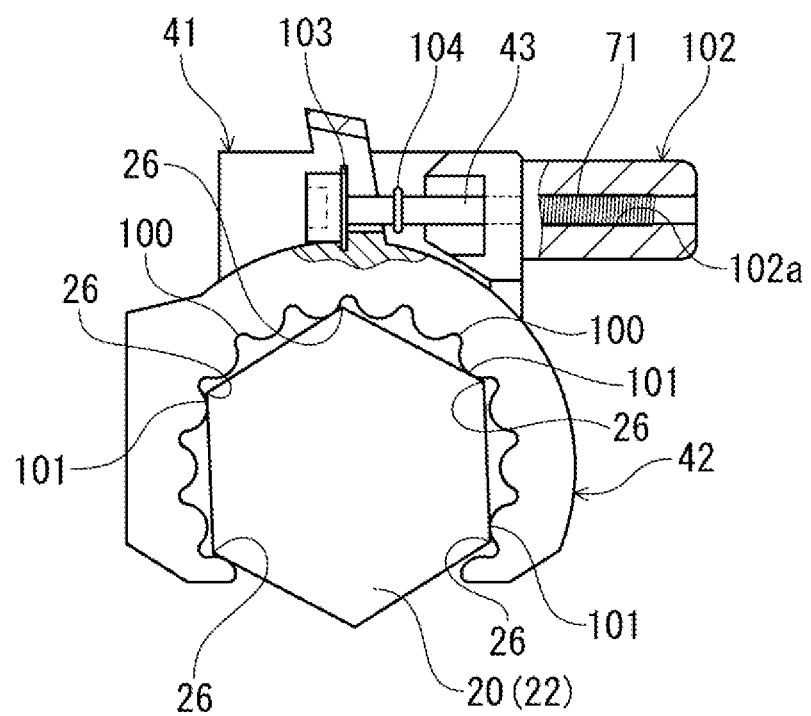

In FIG. 10 and FIG. 11, engaging grooves 61a are formed so that concave parts 100 and convex-shaped arc parts 101 are made contiguous in an arc state on the inner circumference of the second clamp member 42. When the screw member 43 is fastened as depicted in FIG. 11(b), the first clamp member 41 is reliably positioned and fixed. Also, one side surface of each convex-shaped arc part 101 of the second clamp member 42 is fastened so as to bite one surface of each outer circumferential edge part 26 of the female nut 22. Thus, the coupling part 4 is fastened to the additionally fastening direction to be reliably fixed without a fear of looseness of the coupling part 4 at all, and the fixed state is maintained.

In the drawings, in a state in which the screw member 43 is inserted into the insertion hole 63 of the second clamp member 42, a washer 103 is attached to one side of the screw member 43 and a stop ring 104 is attached to the other side. Therefore, when the lock device is assembled, there is no fear of dropping of the screw member 43 from the second clamp member 42 without reason, thereby making operability favorable.

Figure 12A:
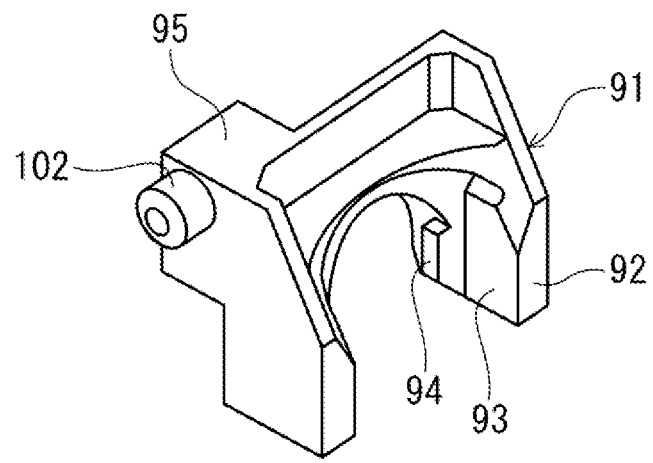
FIG. 12(a) is a perspective diagram of a third clamp member depicting another example of the second embodiment and FIG. 12(b) is a descriptive diagram of a partially-cutout bottom surface of the same as above.

In FIG. 10(a) and FIG. 12(a), the first clamp member 41 and the third clamp member 91 each have a female-screw barrel part 102 integrally secured to the first and third clamp members 41 and 91, respectively, as a screw hole. The female-screw barrel part 102 has a screw hole, which has a female screw 102a into which the male screw 71 of the bolt member 70 can be screwed. Therefore, there is no fear of dropping of a nut or the like during a fastening operation, and also, operability is extremely favorable. Note in the drawing that 105 denotes a casted surface or a display surface where a character or the like is to be displayed.

Figure 12B:
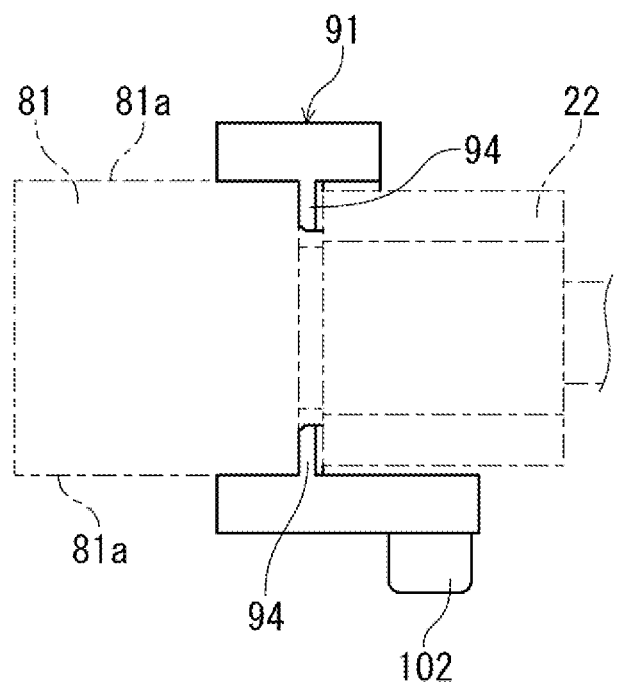

Also, FIG. 11(a) and FIG. 12(b) are descriptive diagrams of a bottom surface depicting a state in which the first clamp member and the third clamp member, respectively, perform positioning. From FIG. 11(a), the first clamp member 41 is locked to the male nut 23 and the female nut 22 for positioning. From FIG. 12(b), the third clamp member is locked to the valve body 81 and the female nut 22 for positioning.

The present invention is not limited to the description of the embodiments described above, and can be variously changed in a range not deviating from the invention described in the claims of the present invention.

REFERENCE SIGNS LIST 1 device main body
3, 80 valve main body
4 coupling part
12, 13 coupling
20, 82 screwed member
21, 83 screwing member
22 female nut
23 male nut
26 outer circumferential edge part
31 two parallel side surfaces
41 first clamp member
42 second clamp member
43 screw member
51 parallel engaging surface
54 screw hole
61 engaging groove
61a engaging groove
63 insertion hole
81 valve body
81a two side surfaces
91 third clamp member
93 fixing engaging surface
100 concave part
101 convex-shaped arc part
102 female-screw barrel part
103 washer
104 stop ring
P coupling axis

The invention claimed is:

1. A lock device for a pipe coupling and a valve coupling part, the lock device being operable to prevent looseness of a coupling part formed of a piped and connected valve body and a female nut, the lock device comprising:
   a first clamp member installed on an outer circumferential surface of the valve body;
   a second clamp member attached to an outer circumferential side of the female nut;
   a screw member for fastening both of the first and second clamp members,
   wherein both of the first and second clamp members are fastened with the screw member, thereby being fixed to the coupling part while a force is applied to a direction of additionally fastening the coupling part, and wherein the first clamp member and the second clamp member are fastened together by the screw member so that the coupling is fixed to the coupling part while a force is applied in a direction of additionally fastening the coupling.

2. The lock device for the pipe coupling and the valve coupling part according to claim 1, wherein the first clamp member is provided with fixing engaging surfaces for positioning and fixing to two parallel side surfaces except a bottom surface on an outer circumferential side of the valve body.

3. The lock device for the pipe coupling and the valve coupling part according to claim 2, wherein with a screw hole or an insertion hole formed in the first clamp member and a screw hole or an insertion hole formed in the second clamp member, fastening can be made by the screw member in an inserted state.

4. The lock device for the pipe coupling and the valve coupling part according to claim 2, wherein the first clamp member is provided with a screw hole and the second clamp member is provided with a screw hole so that fastening can be made by the screw member in an inserted state, and wherein one of the screw holes is a female-screw barrel part integrally provided to the first clamp member or the second clamp member.

5. The lock device for the pipe coupling and the valve coupling part according to claim 2, wherein an insertion hole is formed in the first clamp member and an insertion hole is formed in the second clamp member such that fastening can be made by the screw member in an inserted state, and wherein a washer is attached to one side of the screw member inserted into the insertion hole of the second clamp member and a stop ring is attached to another side.

6. The lock device for the pipe coupling and the valve coupling part according to claim 1, wherein with a screw hole or an insertion hole formed in the first clamp member and a screw hole or an insertion hole formed in the second clamp member, fastening can be made by the screw member in an inserted state.

7. The lock device for the pipe coupling and the valve coupling part according to claim 1, wherein the first clamp member is provided with a screw hole and the second clamp member is provided with a screw hole so that fastening can be made by the screw member in an inserted state, and wherein one of the screw holes is a female-screw barrel part integrally provided to the first clamp member or the second clamp member.

8. The lock device for the pipe coupling and the valve coupling part according to claim 1, wherein an insertion hole is formed in the second clamp member such that fastening can be made by the screw member in an inserted state, and wherein a washer is attached to one side of the screw member inserted into the insertion hole of the second clamp member and a stop ring is attached to another side.

9. A lock device for a pipe coupling and a valve coupling part, the lock device being operable to prevent looseness of a coupling part formed of a female nut and a male nut, the lock device comprising:

a first clamp member attached to an outer circumferential side of the male nut;

a second clamp member attached to an outer circumferential side of the female nut; and a screw member for fastening the first and second clamp members together, wherein the first and second clamp members are fastened with the screw member, thereby being fixed to the coupling part while a force is applied to a direction of additionally fastening the coupling part, wherein by fastening of the first clamp member and the second clamp member, the coupling is fixed to the coupling part while the force is applied to a direction of additionally fastening the coupling, and wherein engaging grooves for being locked to outer circumferential edge parts of the female nut in a polygonal shape are formed in a contiguous state on an inner circumferential side of the second clamp member.

10. The lock device for the pipe coupling and the valve coupling part according to claim 9, wherein the first clamp member is provided with parallel engaging surfaces for engaging two parallel side surfaces of the male nut to prevent rotation about a coupling axis direction.

11. The lock device for the pipe coupling and the valve coupling part according to claim 10, wherein with a screw hole or an insertion hole formed in the first clamp member and a screw hole or an insertion hole formed in the second clamp member, fastening can be made by the screw member in an inserted state.

12. The lock device for the pipe coupling and the valve coupling part according to claim 10, wherein engaging grooves for being locked to outer circumferential edge parts of the female nut in a polygonal shape are formed in a contiguous state on an inner circumferential side of the second clamp member.

13. The lock device for the pipe coupling and the valve coupling part according to claim 9, wherein with a screw hole or an insertion hole formed in the first clamp member and a screw hole or an insertion hole formed in the second clamp member, fastening can be made by the screw member in an inserted state.

14. The lock device for the pipe coupling and the valve coupling part according to claim 13, wherein the screw hole is a female-screw barrel part integrally provided to the first clamp member or the second clamp member.

15. The lock device for the pipe coupling and the valve coupling part according to claim 13, wherein an insertion hole is formed in the second clamp member, and wherein a washer is attached to one side of the screw member inserted into the insertion hole of the second clamp member and a stop ring is attached to another side of the screw member.

16. The lock device for the pipe coupling and the valve coupling part according to claim 13, wherein engaging grooves for being locked to outer circumferential edge parts of the female nut in a polygonal shape are formed in a contiguous state on an inner circumferential side of the second clamp member.

17. The lock device for the pipe coupling and the valve coupling part according to claim 9, wherein the engaging grooves are formed so that concave parts and convex-shaped arc parts are made contiguous to be in a circular state on an inner circumference of the second clamp member.

* * * * *